Dec. 5, 1961   S. T. GLOVER   3,011,638
CYCLONES
Filed Sept. 3, 1958
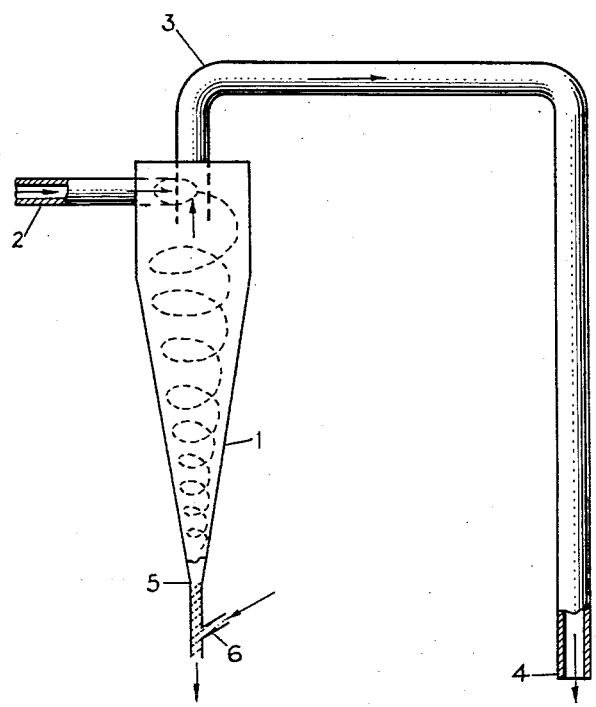
INVENTOR
SIDNEY THOMAS GLOVER
BY Cushman, Darby & Cushman
ATTORNEYS 3,011,638
CYCLONES
Sidney Thomas Glover, Widnes, England, assignor to Imperial Chemical Industries Limited, London, England, a corporation of Great Britain
Filed Sept. 3, 1958, Ser. No. 758,828
Claims priority, application Great Britain Sept. 6, 1957
7 Claims. (Cl. 209—211)

The present invention is concerned with cyclones and is particularly concerned with hydrocyclones, that is to say cyclones of the kind which are adapted to operate on liquids containing solids, as for instance slurries, to effect the concentration of said solids or the preferential separation of the coarser solid particles.

The feed to such a hydrocyclone is introduced tangentially and a rapidly spiralling vortex is formed as a result of which separation of solid particles occurs under the influence of centrifugal force. Two separated fractions are obtained, an "underflow" or "apex discharge" and an "overflow." As a rule the underflow has a relatively high concentration of solid matter and contains the coarse or heavy particles, whilst the overflow has a lower concentration of solids and contains the fine or light particles. It is the "underflow" or "apex discharges" with which this invention is specifically concerned.

In many processes it is important both to ensure that the slurry discharged as the "underflow" is as concentrated as possible and also to control this concentration within narrow limits. Conventionally this is done by applying back pressure to the underflow by some form of valve or restriction to which complicated automatic control devices are sometimes fitted. Such a valve or restriction at the apex opening, however, can be the cause of frequent blockages, particularly if the solid particles have rough uneven surfaces as for instance particles of titanium "sponge."

The object of the present invention is to provide a hydrocyclone of simpler construction than heretofore to permit a concentrated underflow to be taken off irrespective of variations in feed concentration up to the maximum solids rate for any particular apex orifice and without blockage even when rough surfaced solid particles are being handled.

The following observations are common to all hydrocyclones.

When a hydrocyclone is fed only with liquid through its tangential inlet at the top, at the correct flow rate there is formed a vortex having a central air column which extends between the overflow and underflow connections. The general liquid flow-pattern superimposed upon the spin is downwards at the walls, radially inwards, and upwards near the air column. For a fixed feed rate the diameter of the apex opening at the bottom of the cyclone can be progressively reduced, as by means of a valve or restriction, until it becomes less than that of the air column, at which time no underflow is delivered apart from insignificant drainage.

If the same procedure is followed when liquid containing suspended solids is being fed the characteristics of the apex discharge change from those of a spiral spray of thin slurry, as in the case when liquid only is fed to a continuous or "rope" discharge of thick slurry. This latter discharge is due to the fact that a bed of solids builds up in the apex itself, and it greatly increases the tendency for oversize particles to be carried over and lost in the overflow, and is also the cause of frequent blockages. In order to obviate these problems and combine high efficiency of solids separation with the thickest possible underflow it is necessary to allow the bed of solids to build up outside the apex itself, while at the same time preventing blockages by keeping this bed moving. Structures embodying the present invention operate in this improved manner.

It has now been found that the addition of the apex, of an extension in the form of a tube having at least one perforation in the side thereof permits the above desirable conditions to be obtained and an underflow slurry of high concentration to be maintained almost indefinitely. In operation, a small bed of solids is built up in the vertical tube and air is drawn in through the side perforation. This air which is drawn or sucked in by the discharge velocity of the irregular slurry particles through the perforation in the upper extension of the apex, either displaces liquid upwards thus maintaining the high concentration of solids required in the slurry moving downwards, or acts as a nozzle of instantaneously variable size which automatically controls the slurry thickness at the hydrocyclone apex.

The bed of solids referred to may occupy the whole cross section of the extension or only part of it, according to variations in the feed rate of solids, size range of solids and diameter of extension. In any case, however, there is never a complete blockage of the extension because of the gaps between the irregular solid particles which build up there. It is up through these gaps that the air passes to displace the liquid upwardly, as well as keep the solids in motion and thus further prevent the possibility of blockage.

According to the present invention the hydrocyclone has an aperture of constant size at its apex, with a tubular extension depending from said apex and having at least one perforation or opening in a side wall thereof.

It is preferred that no side perforation should be nearer to the apex than a distance equal to the diameter of the tubular extension.

Said tubular extension having at least one side or lateral perforation can be for instance a multi-branch tubular extension as for example Y-shaped extension.

When working with the hydrocyclone in a vertical position it is usually found to be necessary to avoid a hydrostatic head against the overflow, indeed it is preferred that the overflow pipe be brought down outside the device to at least the level of the hydrocyclone apex before venting to atmosphere. Under these conditions it is also usually found that there is an optimum feed rate for the correct pressure to exist in the hydrocyclone.

If desired the hydrocyclone can be provided with interchangeable apex fittings of different diameter of aperture, selection of aperture size being commensurate with the solids feed rate and particle size distribution.

One embodiment of the invention is illustrated by way of example in the diagrammatic drawing accompanying specification wherein 1 is the conical portion of the hydrocyclone, 2 is the tangential feed pipe, 3 is the exit pipe for the overflow, 4 is the exit for the overflow, 5 is the apex, and 6 is the Y-shaped apex fitting.

In said embodiment of the invention a thick slurry of titanium can be discharged as an apex discharge from Y-shaped apex fitting 6, as a thin slurry of titanium is being fed into the feed pipe 2. In the vertical space between the apex 5 and the outlet of the vertical limb of the Y-shaped apex fitting 6 a column of titanium is formed of about one inch long and this column is kept moving by air which is drawn into the hydrocyclone through the side arm of the Y-shaped apex fitting 6 by the action of the discharging slurry. The exit of the overflow pipe 4 is below the level of the apex 5.

By way of example for a hydrocyclone of 6 in. diameter capable of handling 30 gals./minute of a 4% titanium slurry at a feed pressure of 15 lb./sq. in. the Y-shaped apex fitting 6 can be 3 inches long and 0.5 inch internal diameter with the side arm 1.5 inches below the apex.

It has been found that with such an embodiment of a hydrocyclone of the invention the composition of the slurry of titanium which is fed thereto can be allowed to fluctuate between 4% and practically zero without affecting the concentration of the titanium slurry underflow which may be of the order 45% titanium by weight, corresponding to an 85% settled column of titanium even when the feed is practically devoid of titanium, and that the average efficiency of recovery may be 99.5%.

What I claim is:

1. A tangential feed hydrocyclone adapted to operate on liquids containing solids to effect the controlled concentration of said solids as well as the controlled preferential separation of the coarser solid particles, comprising a main body portion having a conical lower portion, an overflow tube connected to said body portion, the apex of said conical portion having an aperture therein of constant size, and a tubular extension attached to and communicating with the apex of said conical portion, said tubular extension having at least one perforation in its side in communication with the atmosphere.

2. A hydrocyclone as claimed in claim 1 wherein said tubular extension is of constant diameter and further wherein said side perforation in said tubular extension is spaced from said apex at least a distance equal to the diameter of said tubular extension.

3. A hydrocyclone as claimed in claim 1 wherein said tubular extension having at least one side perforation is a multi-branch tubular extension.

4. A hydrocyclone as claimed in claim 3 wherein the multi-branch tubular extension is a Y-shaped extension.

5. A hydrocyclone as claimed in claim 1 wherein said body portion is adapted to receive interchangeable tubular extensions of different diameters of aperture.

6. A hydrocyclone as claimed in claim 1 wherein the discharge end of the overflow tube of said cyclone is positioned at least at the level of the apex of the hydrocyclone.

7. A method of the character described comprising the steps of: introducing liquids containings solids into a hydrocyclone having a tubular extension connected to the apex thereof and an overflow pipe connected thereto; forming a column of such solids in the extension of the apex; introducing into the column of solids formed in the extension of the apex a transverse flow of surrounding air to prevent the solids from becoming blocked in the hydrocyclone apex and extension thereof, and positioning the discharge end of the overflow pipe outlet at least to the level of the apex of the hydrocyclone before venting the same to the atmosphere.

References Cited in the file of this patent

UNITED STATES PATENTS

| | | |
|---|---|---|
| 2,364,405 | Trimbey et al. | Dec. 5, 1944 |
| 2,806,599 | Patrick | Sept. 17, 1957 |
| 2,809,567 | Woodruff | Oct. 15, 1957 |

FOREIGN PATENTS

| | | |
|---|---|---|
| 762,258 | Great Britain | Nov. 28, 1956 |

OTHER REFERENCES

Dorr-Oliver publication, Bulletin 2500, copyright 1951.